Patented Oct. 31, 1939

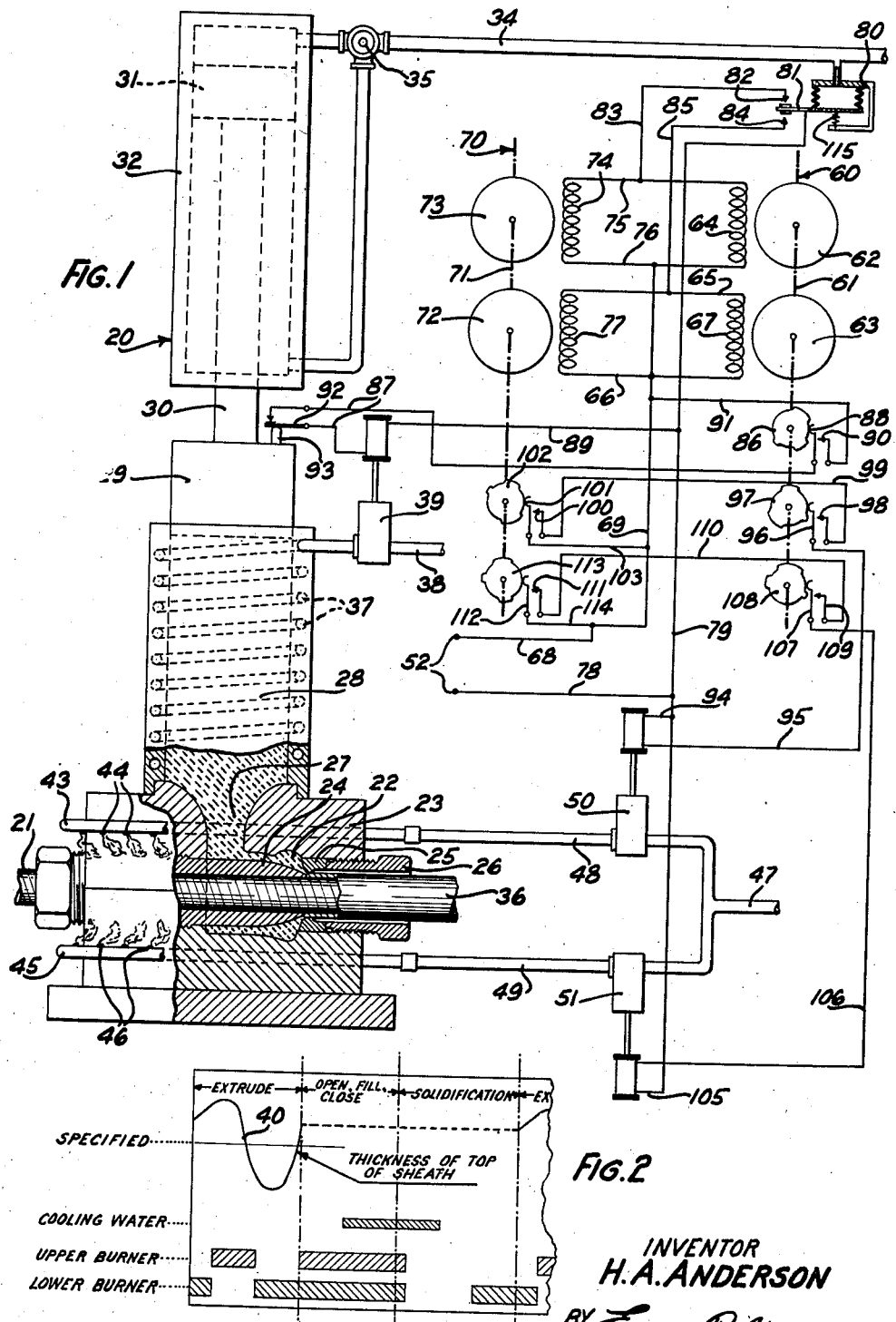

2,177,681

UNITED STATES PATENT OFFICE

2,177,681

MANUFACTURE OF EXTRUDED ARTICLES

Harvey A. Anderson, Western Springs, Ill., assignor to Western Electric Company, Incorporated, New York, N. Y., a corporation of New York Application April 7, 1937, Serial No. 135,437

9 Claims. (Cl. 207—4)

This invention relates to the manufacture of extruded articles, and more particularly to the extrusion of cable sheath.

Certain types of electric cables are provided with a protective covering of lead, lead alloy, or other material. The sheath is applied to the cable in a well known apparatus in which the sheathing material is fed to the machine in molten form, cooled for a definite period and then extruded over the cable core in a plastic condition. In this process the thermal condition of the material at the time of extrusion is a critical element both in the satisfactory operation of the process and the quality of the resultant sheath. Various temperature regulating mechanisms have been developed for apparatus of this type, but accurate thermal control has been difficult, principally because the process is operated intermittently. Usually cold water is circulated through one portion of the machine to reduce the molten sheathing material to the proper degree of plasticity. This tends to create a temperature unbalance which is increased by the development of large quantities of friction heat in another part of the machine when the plastic material is subsequently extruded over the cable and this condition is further aggravated by interruptions in operation for inspection of the product or adjustment of the apparatus.

The temperature unbalance causes irregularities in the thickness of the extruded material. In the manufacture of cable this factor is particularly serious because it necessitates the application of a relatively thick and costly sheath on the cable to insure a designated minimum protection. In efforts to control these thickness variations in cable sheath, extrusion machines have been provided with heating systems of various types. Most of these systems are manually controlled, but in some cases they are automatically responsive to thermocouples or similar instruments mounted in the apparatus walls. However, in all of these installation operation of the heating element is either dependent upon the judgment of the machine operator or, in the case of automatic systems, to the current temperature condition in the apparatus.

Objects of this invention are to provide improved apparatus and methods for maintaining the temperature of heated material accurately within prescribed limits.

In accordance with one embodiment of this invention a conventional pressure fluid actuated cable sheathing apparatus is provided with a system of heating and cooling elements which are operated in accordance with a predetermined program based on the phases of the extrusion cycle and coordinated with the progress of the cycle as performed. The delivery of energy to the heating and cooling units is regulated by a program device which is set to operate the units through a prescribed routine based on an ideal cycle. To accommodate discrepancies between the ideal and actual cycles the controls for the various units are interconnected and the entire program system is synchronized with the operation of the extrusion apparatus. The program device comprises a circuit for each heating or cooling unit controlled by a pair of contacts actuated by a formed can mounted on a shaft driven by a motor and a reset motor, each responsive to changes in the pressure of the press actuating fluid which define steps in the extrusion cycle.

A more complete understanding of the invention may be had from the following detailed description taken in conjunction with the appended drawing, in which:

Fig. 1 is a schematic drawing of a cable sheathing apparatus provided with temperature control mechanism embodying the invention, and Fig. 2 shows a typical curve of the variations normally occurring in the thickness of a cable sheath with respect to the extrusion cycle and an associated chart for the operation of the cooling and heating units shown in Fig .1.

In the appended drawing the invention is adapted to a conventional pressure fluid actuated cable sheathing apparatus 20 shown in Fig. 1. The invention has been adapted to a hydraulic apparatus because this type is used most generally to produce the very high pressures required for cable sheath extrusion, but the invention is equally applicable and valuable to mechanically actuated equipment.

In the extrusion apparatus or press shown in the drawing an uncovered cable core 21 enters an extrusion chamber 22 enclosed in a die block 23 through a core tube 24 which is supported in the left end of the block and extends longitudinally through the block to the right end of the chamber. At the exit end of the chamber a sizing die 25 is mounted adjacent to the end of the core tube and spaced therefrom by means of a sizing die holder 26 which is adjustably threaded into the die block wall. A feed channel 27 in the top of the extrusion chamber communicates with an extrusion cylinder 28 in which a ram 29 is slidably supported. The ram is rigidly connected by means of a shank 30 to a piston 31 in a hydraulic cylinder 32 located above the extrusion cylinder. Oil, water or other suitable fluid is supplied under pressure from a pump (not shown) and conducted to the hydraulic cylinder through a pipe line 34 to either raise or lower the piston and the connected ram as desired under control of a manual valve 35 in the pipe line. A suitable vent or outlet (not shown) is provided for draining the fluid from the cylinder.

In the operation of the press, sheathing material, usually lead or lead alloy, is introduced to the extrusion cylinder in molten form with ram withdrawn, and permitted to cool to a temperature suitable for extrusion. When the material reaches the proper degree of plasticity, fluid under pressure is introduced into the top of the hydraulic cylinder which advances the ram in the extrusion cylinder to force the sheathing material through the adjustable space between the core tube end and the sizing die and around the advancing cable core to form the sheath 36 on the cable.

The apparatus and process so far described are well known and this invention is concerned with regulation of the temperature of the extrudable material in the apparatus to control the thickness of the extruded sheath. The apparatus and control mechanisms are based on analyses of the various extrusion process and apparatus elements which cause variations in the thickness of the extruded sheath.

One of the major causes of variations in the thickness of extruded cable sheath is eccentricity. It has been found that cable sheath extruded by the above described process normally has two distinguishing characteristics. The eccentricity of the sheath undergoes cyclic variation throughout the extrusion process and the thickness of the top half of the sheath as extruded varies inversely as the thickness of the bottom half of the sheath. This characteristic trend is clearly demonstrated by a typical curve 40 in Fig. 2 which shows the variation in thickness of the top half of a cable sheath throughout a complete extrusion cycle. As the top half of the sheath varies inversely in thickness as the bottom half, a typical curve for the bottom half of the sheath would be approximately the reverse of the curve shown.

This cyclic thickness variation is apparently due to differences in the temperatures, and consequently plasticity, of the sheath material at the top and bottom of the extruding chamber at the sizing die as it is extruded. As shown in the curve the thickness of the sheath changes most rapidly near both ends of the extrusion cycle or just before and after the extrusion cylinder is recharged. It appears that when a new charge is admitted at the top of the extrusion chamber it tends to raise the temperature at that point because the new charge is usually hotter than the material remaining in the chamber. As a result, the upper portion of the old charge in the chamber is heated and made more plastic than the material in the lower portion of the chamber. As extrusion begins, the upper portion being more plastic will flow faster and the increased rate of flow in the top portion results in a thicker top sheath. This action continues and increases until the old charge is exhausted. Then as the new charge reaches the point of extrusion, the temperature and viscosity of the material change and the thickness of the sheath approaches the specified value. As the process continues, the top portion of the sheath becomes thinner during the last half of the cycle, returns to normal and then increases in thickness as shown by the curve. The causes of this characteristic behavior are not completely known, but excessive frictional heat generation in the bottom of the block and the prolonged and devious path followed by the lead extruded from that point may be contributing factors. But regardless of the causes, the eccentricity trend can be corrected by the proper addition of heat to the proper portion of the block or chamber as hereinafter described.

The mechanisms provided to compensate for these sheath thickness variations and irregularities and to control sheath eccentricity are constructed to apply and remove heat from the apparatus in accordance with a definite program based on the above analysis.

For cooling the molten lead or other extrudable material and reducing it to plasticity, a spiral pipe or channel 37 is embedded in the wall of the extrusion cylinder and connected to a suitable water supply source (not shown) through a pipe 38. The water can be recirculated or conducted to a drain after use by any suitable means (not shown). The flow of water in the cooling system is controlled by a spring depressed solenoid valve 39 in the pipe line and which is operated by the controller later described.

To supply heat selectively to the die block as required to compensate for sheath eccentricity trends, independent burners are provided for the upper and lower portions of the block. An upper burner 43 encircles the block and is provided with spaced apertures 44 for emitting gas, oil, and other fuel which is burned in flame jets against the outer surface of the block. A similar burner 45 encircles the lower portion of the block and has similar flame apertures 46. The burners are fed through a fuel supply pipe 47 from a suitable source (not shown) and having one branch 48 running to the upper burner and another branch 49 running to the lower burner. The flow of fuel to each burner is independently controlled by a solenoid valve 50 in the upper branch and a solenoid valve 51 in the lower branch line.

The solenoid valves controlling the heaters and cooling water circulation are operated by a program device shown schematically in Fig. 1 to regulate the flow of power from a suitable power source 52 to the various solenoid valves. To provide an adequate control, a separate program unit is provided for the cooling and extrusion portions of the process cycle and the units are interconnected for cooperative operation.

One control unit 60 for the cooling cycle comprises a shaft 61 having a synchronous drive motor 62 and a reset motor 63 fixed thereto. Fixed to the lower end of the shaft as shown are three cams cut to a desired configuration. Each cam has a cam follower and a fixed electrical contact comprising a switch for regulating current flow to the solenoids. A second program unit 70 for the extrusion cycle is similar in construction, having a shaft 71, a synchronous drive motor 72, a reset motor 73 and two cams with associated followers and contacts on the lower end of the shaft.

To correlate the operation of the units, their motors are interconnected. The field coil 64 of the drive motor in the cooling cycle unit 60 is connected in series with the field coil 74 of the reset motor in the extrusion cycle unit 70 by means of wires 75 and 76. Similarly the drive motor coil 77 of the extrusion unit 70 is connected in series with the reset motor coil 67 of the cooling unit 60 through leads 65 and 66. With these interconnections either unit is reset to its starting position when the drive motor of the other unit is energized.

Operation of the units is responsive to the pressure of the fluid which is supplied through the pipe 34 to actuate the machine. One side of the field coil in each unit is connected to one side of the power source 52 through wires 68 and 69. The return circuit from the motors to the power source is conducted through a pressure switch 80 in the pipe line. Various types of conventional pressure switches are suitable for this application. The switch shown in the drawing has an expandable member 81 on a diaphragm exposed to the fluid in the pipe and consequently responsive to the pressure of the fluid. The expandable member is electrically connected to the return side of power source through leads 78 and 79 and is adapted to alternately engage, according to the pressure in the pipe, one fixed contact 82 connected to the drive motor of the cooling unit 60 through a wire 83 or another fixed contact 84 connected to the drive motor of the extrusion unit 70 through a wire 85. In this manner the program units are selectively started and reset in accordance with the pressure of the fluid in the hydraulic cylinder.

The cams on the units are constructed to operate the cooling and heating apparatus in accordance with a predetermined program. The cooling water solenoid is controlled by a cam 86 on the shaft of its unit 60. One lead of the solenoid coil is connected through a circuit 87 to a follower 88 on the cam 86 and the other coil lead 89 is connected to one power lead 79. A fixed contact 90 is mounted for engagement by the follower and is electrically connected to the power lead 69 by a wire 91. Engagement of the fixed contact by the follower completes the control circuit to the solenoid regulating the flow of cooling water in the spiral pipe imbedded in the extrusion cylinder wall. Circulation of the cooling water should be completed before the ram has entered or progressed any appreciable distance into the cylinder to start extrusion. To prevent operation of the control circuit to cause the circulation of water during the extrusion period, for example, when the pressure is dropped to stop the machine and inspect the product or adjust the apparatus, a lever switch 92 is placed in the line 87 running from the solenoid coil to the controller. This switch is engaged and closed against its spring to complete the circuit to the solenoid by a lug 93 on the ram at all times that the ram is in its elevated position and the switch is released by its spring or gravity to break the circuit and prevent the flow of water at any time the ram is entered into the cylinder.

The upper and lower heating elements on the die block are controlled by cam combinations on the two control units to operate the heaters properly throughout the complete process. One lead 94 from the upper solenoid coil runs to the power line 79 and the other coil lead 95 is connected to a follower 96 on a cam 97 secured to the shaft of the cooling unit 60. A fixed contact 98 associated with this follower is connected by a wire 99 to a fixed contact 100 on the other unit which is adapted for engagement by a cam follower 101 riding a cam 102 on the unit shaft and connected to the return side of the power line 69 through a wire 103. Thus, the upper burner solenoid will be opened against its spring to operate the heater at any time that both contacts 98 and 100 are engaged by their respective followers.

A similar mechanism is provided for operating the solenoid for the lower heater. One lead 105 from this solenoid coil is connected to the power line 79 and the other coil lead 106 runs to a follower 107 on a cam 108 secured to the shaft unit 60. A fixed contact 109 in this switch combination is connected through wire 110 to a fixed contact 111 in unit 70 which is engaged by a follower 112 on a cam 113 and connected to power line 69 through a wire 114.

As the current to each burner solenoid flows through switches on both controllers, burner operation is responsive to the condition of both switches. The switches are constructed to make one complete revolution during their respective phase of the extrusion cycle, as determined by changes in hydraulic pressure, and in a normal cycle the two controllers each make one complete revolution between the beginning of extrusion of one charge and beginning of extrusion of the next charge. Beginning of extrusion is accomplished by the introduction of oil or other fluid at high pressure to the top of the pressure cylinder. This high pressure in the feed pipe 34 causes the movable contact on the pressure valve 80 to engage the fixed contact 84 completing the circuit to the drive motor of the extrusion cycle unit 70 and simultaneously resetting the cooling cycle unit if it is in operation. During the extrusion period the upper and lower burners are operated in their prescribed routines by their respective cams through the switches on the cooling cycle unit 60 which are normally in a make position.

When extrusion of the charge is completed the hydraulic pressure is cut off and the ram raised with relatively light pressure. This causes the movable contact in the pressure switch to shift to fixed contact 82 under a spring 115 in the switch. This resets the extrusion cycle unit to normal and simultaneously starts the cooling cycle unit which controls the cooling water circulation as previously described and also operates the heaters during the cooling period. During this period the heater switches on the extrusion cycle unit are in make position to permit the switches on the other unit to control the heaters.

If the process is varied from normal the proper unit is placed in operation by the corresponding change in hydraulic pressure so that the heating and cooling units are properly operated in accordance with the process phase in progress.

The contour of the cams will vary for different cable sizes and operating conditions and is determined in each case by an analysis of the product and process. A representative operation analysis is shown in Fig. 2. The lower portion of the figure shows in chart form the operating cycle for the various heating and cooling elements with the cross-hatched sections representing the periods the units are in operation. These elements are operated to counteract the normal tendency of the extruded sheath to become eccentric as shown in the coordinated curve at the top of the figure.

In the particular example shown in the chart the extrusion portion of the cycle requires approximately six minutes. It will be noted from the eccentricity curve that during the first two minutes of this cycle the thickness of the upper half of the sheath increases rapidly. To overcome this tendency the lower burner is operated before extrusion begins and for about the first minute of the extrusion cycle to heat the material at the bottom of the die and increase its plasticity. As also shown by the curve, the sheath attains approximate concentricity at the midpoint of the cycle and then the lower half tends to increase in thickness during the latter half of the cycle with a recurrence to normal near the end of the cycle. To compensate for the unbalance causing this variation, the upper burner is started when the lower burner is turned off after approximately one minute of the cycle and the upper burner continues to operate for about the middle one-third of the cycle. It is then turned off and for approximately the last third of the cycle the lower burner is operated alone. With this alternative operation of the upper and lower burners, heat is produced selectively in the die block to maintain the material at temperatures which insure the production of concentric sheath.

At the termination of the extrusion cycle, the ram is withdrawn from the cylinder and the accompanying change in hydraulic pressure resets the extrusion controller and starts the cooling cycle controller. Molten material is then added to the cylinder and during this period both burners are operated by the cooling cycle controller to maintain the material in the die block at the proper temperature. After the press has been filled the ram is lowered to the top of the cylinder. During this time and the subsequent cooling period, the cooling water is circulated for a definite interval by its cam to reduce the material to the proper degree of plasticity. Both burners are cut off near the beginning of the solidification period and the lower burner is started after the solidification period has been about half completed in order to introduce the proper amount of heat into the lower portion of the block to avoid eccentricity at the beginning of the extrusion cycle. When extrusion is started the introduction of pressure to the cycle causes the pressure switch to reset the cooling cycle unit and start the extrusion cycle unit which then repeats the above described program. In the described application an extrusion pressure of about 30,000 pounds per square inch on the lead is employed. In some cases it is desirable to use a creeping press mark by applying relatively light pressure to the material, for example, 10,000 pounds per square inch, while it is solidifying. In these cases the pressure switch is adjusted to start the extrusion cycle unit when the pressure exceeds this value and the cooling unit operates until full extrusion pressure is employed. For other installations the setting of the pressure switch is accommodated to the particular pressure and other conditions employed.

The described sequence of operations is varied for different apparatus, sheath sizes or other conditions, but in each case a satisfactory program is based on a similar analysis of sheath eccentricity. An analysis of sheath eccentricity and provision for properly anticipating and controlling this factor as described permits a reduction in the average thickness of the sheath required and, consequently, the cost of the cable.

It will be apparent that the above described procedure and apparatus can be adapted to a variety of extrusion processes and equipment to provide improved operation and product quality. For example, the use of electrical instead of combustible fuel heaters is feasible, and the control mechanism can be readily adapted to mechanically operated apparatus. Also the use of pneumatic systems to control the operation of the heating and cooling units is practical.

Various adaptations and modifications of the above disclosure are contemplated to adapt the invention to individual conditions, and it is to be understood that the invention is limited only by the scope of the appended clams.

What is claimed is:

1. A method of controlling the eccentricity of cable sheath extruded in an intermittent process in which a measured charge of heated sheath material is placed in an extrusion chamber, cooled in the chamber for a fixed time and then extruded into a sheath in a predetermined time period, comprising the steps of producing a sample sheath of desired size by said process, measuring the thickness of the sample sheath portions extruded at various stages of the extrusion period to determine its normal eccentricity trend, extruding a second sheath of the same size as the sample sheath by said process, and applying heat intermittently to the second sheath as it is extruded, said heat being applied at those corresponding intervals of the process at which normal eccentricity occurred in the sample sheath.

2. In an apparatus for extruding cable sheath in an intermittent cycle, said cycle including one portion in which a measured quantity of molten sheath material is placed in the apparatus, a second and independent cycle portion in which the molten material is cooled in the apparatus and a third and independent cycle portion in which the cooled material is extruded in the form of a sheath, means for operating the apparatus, a heater on the apparatus, a controller for regulating the heater during one of said cycle portions, a second controller for regulating the heater during another of said cycle portions, and means responsive to said apparatus operating means for causing the first and second controllers to selectively regulate the heater during the performance of their respectively designated cycle portions by the apparatus.

3. In a fluid actuated extrusion apparatus of the intermittent cycle type in which a fixed charge of molten material is placed in an extrusion chamber, cooled for a period in the chamber and then extruded from the chamber in a definite period, means for supplying actuating fluid to the apparatus at one pressure during the cooling period and at a different pressure during the extrusion period, means for cooling the chamber during a selected portion of the intermittent cycle, means for heating the chamber during a different portion of the intermittent cycle, and means responsive to the changes in hydraulic pressure which introduce the cycle periods for selectively operating said cooling and heating means during the performance of their respective cycle portions.

4. In a hydraulically operated extrusion apparatus in which a fixed quantity of molten material is charged in one step, cooled for a definite period in a second step and finally extruded at a definite rate in a third step, a hydraulic means adapted to operate the apparatus at one pressure during the cooling step and to operate the apparatus at a different pressure during the extruding step, an extrusion chamber, a plurality of heaters on the chamber, a fuel supply system having a solenoid valve to control the flow of fuel to each heater, a switch for operating the solenoids during the charging and cooling steps, and a second switch for operating the solenoids during the extrusion step, said switches being interconnected and responsive to changes in the hydraulic pressure which occur at a change from one process step to another for causing operation of the proper switch during the performance of said charging, cooling and extrusion steps periods by the apparatus.

5. In a hydraulically operated apparatus in which a fixed charge of extrudable material is placed in the apparatus in molten form, cooled for a period and then extruded in a predetermined period, hydraulic means for operating the apparatus at one pressure throughout the cooling period and at a different pressure throughout the extrusion period, a heater on the apparatus, a regulator for operating the heater during the charging period, a second regulator for operating the heater during the extrusion period, and a controller on the regulators responsive to changes in the hydraulic pressure which occur at the times a different period is started for causing the regulators to operate the heaters during their respective periods.

6. A method of extruding cable sheath which comprises the steps of charging molten material into a chamber, cooling the material for a definite period in the chamber, subsequently extruding the material from the chamber for a definite period, and applying heat intermittently to the extruding material during fixed portions of the extrusion period.

7. A method of extruding cable sheath which comprises the steps of charging molten material into a chamber, cooling the material for a definite period in the chamber, extruding the cooled material for a definite period from the chamber in a tubular sheath, applying heat to a selected portion of the sheath periphery at fixed intervals during the extrusion period, and applying heat to another portion of the sheath periphery at fixed and different intervals of the extrusion period.

8. A method of extruding cable sheath which comprises charging a fixed quantity of molten material into a walled chamber, circulating a coolant in one portion of the chamber walls for a definite period to reduce the material to a proper degree of plasticity, extruding the material from the chamber in a given period of time, and applying heat to a second portion of the chamber wall intermittently and at fixed portions of the extrusion and cooling periods.

9. In an apparatus for extruding cable sheath in a series of independent steps in which a measured quantity of molten sheath material is placed in the apparatus in the first step, cooled in the apparatus for a definite period in the second step and extruded in the form of a sheath in the final step, means for actuating the apparatus, a heater on one portion of the apparatus, a second heater on another portion of the apparatus, means for operating the first heater in a fixed cycle adapted to the performance of said steps by the apparatus, means for operating the second heater in a different fixed cycle adapted to the performance of said steps, said heater operating means being responsive to said apparatus actuating means for causing introduction of the respective heater cycles at the times the apparatus steps are started by the apparatus.

HARVEY A. ANDERSON.